United States Patent
Matsushiro et al.

(10) Patent No.: US 9,932,250 B2
(45) Date of Patent: Apr. 3, 2018

(54) MEMBRANE FILTRATION SYSTEM

(71) Applicant: Kabushiki Kaisha Toshiba, Tokyo (JP)

(72) Inventors: Takeshi Matsushiro, Yokohama (JP);
Katsuya Yokokawa, Fuchu (JP);
Futoshi Kurokawa, Tachikawa (JP);
Ryo Namba, Fuchu (JP); Koichi Matsui, Tokyo (JP); Hideaki Yamagata, Urayasu (JP); Yuka Hiraga, Tokyo (JP); Seiichi Murayama, Fuchu (JP); Hiroyuki Tokimoto, Kawasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 0 days.

(21) Appl. No.: 14/860,525

(22) Filed: Sep. 21, 2015

(65) Prior Publication Data
US 2016/0009572 A1 Jan. 14, 2016

Related U.S. Application Data

(63) Continuation of application No. 13/186,177, filed on Jul. 19, 2011, now abandoned.

(30) Foreign Application Priority Data

Sep. 15, 2010 (JP) ................................ 2010-207175

(51) Int. Cl.
*B01D 61/06* (2006.01)
*B01D 61/04* (2006.01)
(Continued)

(52) U.S. Cl.
CPC ............ *C02F 1/441* (2013.01); *B01D 61/022* (2013.01); *B01D 61/04* (2013.01); *B01D 61/06* (2013.01);
(Continued)

(58) Field of Classification Search
CPC .... B01D 61/02; B01D 61/022; B01D 61/025; B01D 61/027; B01D 61/06; B01D 61/08;
(Continued)

(56) References Cited

U.S. PATENT DOCUMENTS

| | | | |
|---|---|---|---|
| 4,966,708 A | 10/1990 | Oklejas et al. | |
| 5,458,781 A | 10/1995 | Lin | |

(Continued)

FOREIGN PATENT DOCUMENTS

| | | |
|---|---|---|
| CN | 1440933 | 9/2003 |
| CN | 1733615 | 2/2006 |

(Continued)

OTHER PUBLICATIONS

First Office Action issued by the Japanese Patent Office dated Feb. 3, 2015, in counterpart Japanese Patent Application No. 2011-198323, and an English translation thereof (7 pages total).

(Continued)

*Primary Examiner* — Pranav N Patel
(74) *Attorney, Agent, or Firm* — Finnegan, Henderson, Farabow, Garrett & Dunner, L.L.P.

(57) ABSTRACT

According to one embodiment, a membrane filtration system includes a raw water tank, a pretreatment membrane module, a raw water feed line, a high-pressure RO membrane module, a high-pressure line, a preceding power recovery unit which pressurize the pretreated water by transmitting the pressure of the concentrate to the pretreated water, a succeeding power recovery unit which pressurize the raw water by transmitting a remaining pressure of the concentrate to the raw water, a concentrate discharge line, a first pressure transmission line communicating to the power recovery unit by being branched from the high-pressure line, a second pressure transmission line communicating to the power recovery unit by being branched from the raw water (Continued)

feed line, and a valve provided in the drain line to regulate a discharge of the concentrate from the power recovery unit in accordance with a pressure loss in the pretreatment membrane module.

2 Claims, 10 Drawing Sheets

(51) Int. Cl.
B01D 61/12 (2006.01)
C02F 1/44 (2006.01)
B01D 61/02 (2006.01)
B01D 61/10 (2006.01)
B01D 61/08 (2006.01)
B01D 61/58 (2006.01)
C02F 103/06 (2006.01)
C02F 103/08 (2006.01)
B01D 61/14 (2006.01)

(52) U.S. Cl.
CPC ............ *B01D 61/08* (2013.01); *B01D 61/10* (2013.01); *B01D 61/12* (2013.01); *B01D 61/58* (2013.01); *B01D 61/025* (2013.01); *B01D 61/14* (2013.01); *B01D 2311/14* (2013.01); *B01D 2313/243* (2013.01); *C02F 1/444* (2013.01); *C02F 2103/06* (2013.01); *C02F 2103/08* (2013.01); *C02F 2209/03* (2013.01); *C02F 2303/10* (2013.01); *Y02W 10/30* (2015.05)

(58) Field of Classification Search
CPC ........ B01D 61/10; B01D 61/12; B01D 61/58; B01D 2317/02; B01D 2317/025; B01D 2321/04; B01D 2321/10; B01D 2321/12; B01D 2313/24; B01D 2313/243; B01D 2313/246; B01D 2313/48; B01D 2315/10; B01D 2311/04; B01D 2311/06; B01D 2311/08; C02F 2303/10
See application file for complete search history.

(56) References Cited

U.S. PATENT DOCUMENTS

| | | | |
|---|---|---|---|
| 6,139,740 A | 10/2000 | Oklejas | |
| 6,508,936 B1 | 1/2003 | Hassan | |
| 8,137,542 B2 | 3/2012 | Abe et al. | |
| 8,702,978 B2 | 4/2014 | Yokokawa et al. | |
| 8,834,712 B2 | 9/2014 | Katayama et al. | |
| 9,145,310 B2 | 9/2015 | Namba et al. | |
| 2004/0007527 A1* | 1/2004 | Pedersen | B01D 61/142 210/650 |
| 2006/0054223 A1 | 3/2006 | Baumgarten et al. | |
| 2007/0080113 A1* | 4/2007 | Vuong | B01D 61/022 210/650 |
| 2007/0138092 A1 | 6/2007 | Smith et al. | |
| 2008/0105617 A1 | 5/2008 | Oklejas | |
| 2009/0166276 A1 | 7/2009 | Abe et al. | |
| 2011/0056876 A1 | 3/2011 | Ide et al. | |
| 2011/0056878 A1 | 3/2011 | Matsushiro et al. | |
| 2011/0062062 A1 | 3/2011 | Takahashi et al. | |
| 2011/0062063 A1 | 3/2011 | Takahashi et al. | |
| 2013/0094949 A1 | 4/2013 | Takahashi et al. | |

FOREIGN PATENT DOCUMENTS

| | | | |
|---|---|---|---|
| JP | 62-095702 | | 6/1987 |
| JP | 2000-218268 | | 8/2000 |
| JP | 2001-46842 | | 2/2001 |
| JP | 2001-149932 | | 6/2001 |
| JP | 2002-001331 | | 1/2002 |
| JP | 2006-187719 | * | 7/2006 |
| JP | 2008-029906 | | 2/2008 |
| JP | 2008-100219 | | 5/2008 |
| JP | 2008-149285 | | 7/2008 |
| JP | 2008-183510 | | 8/2008 |
| JP | 2009-172462 | | 8/2009 |
| JP | 2010-063976 | | 3/2010 |
| WO | WO-2010/052651 | | 5/2010 |

OTHER PUBLICATIONS

Notification of the First Office Action issued by the State Intellectual Property Office of the Peoples' Republic of China dated Jan. 16, 2013, in counterpart Chinese Patent Application No. 201110259265.X, and an English translation thereof (19 pages total).
English language machine translation of JP-2006-187719, pp. 1-24.
Namba, R. et al., "Seawater Desalination Apparatus," U.S. Appl. No. 13/104,756, filed May 10, 2011.
Katayama, K. et al., "Seawater Desalination System," U.S. Appl. No. 13/013,241, filed Jan. 5, 2011.
Takahashi et al., U.S. Appl. No. 13/687,017, filed Nov. 28, 2012 (Abandoned).
Yokokawa et al., U.S. Appl. No. 13/185,782, filed Jul. 19, 2011.

* cited by examiner

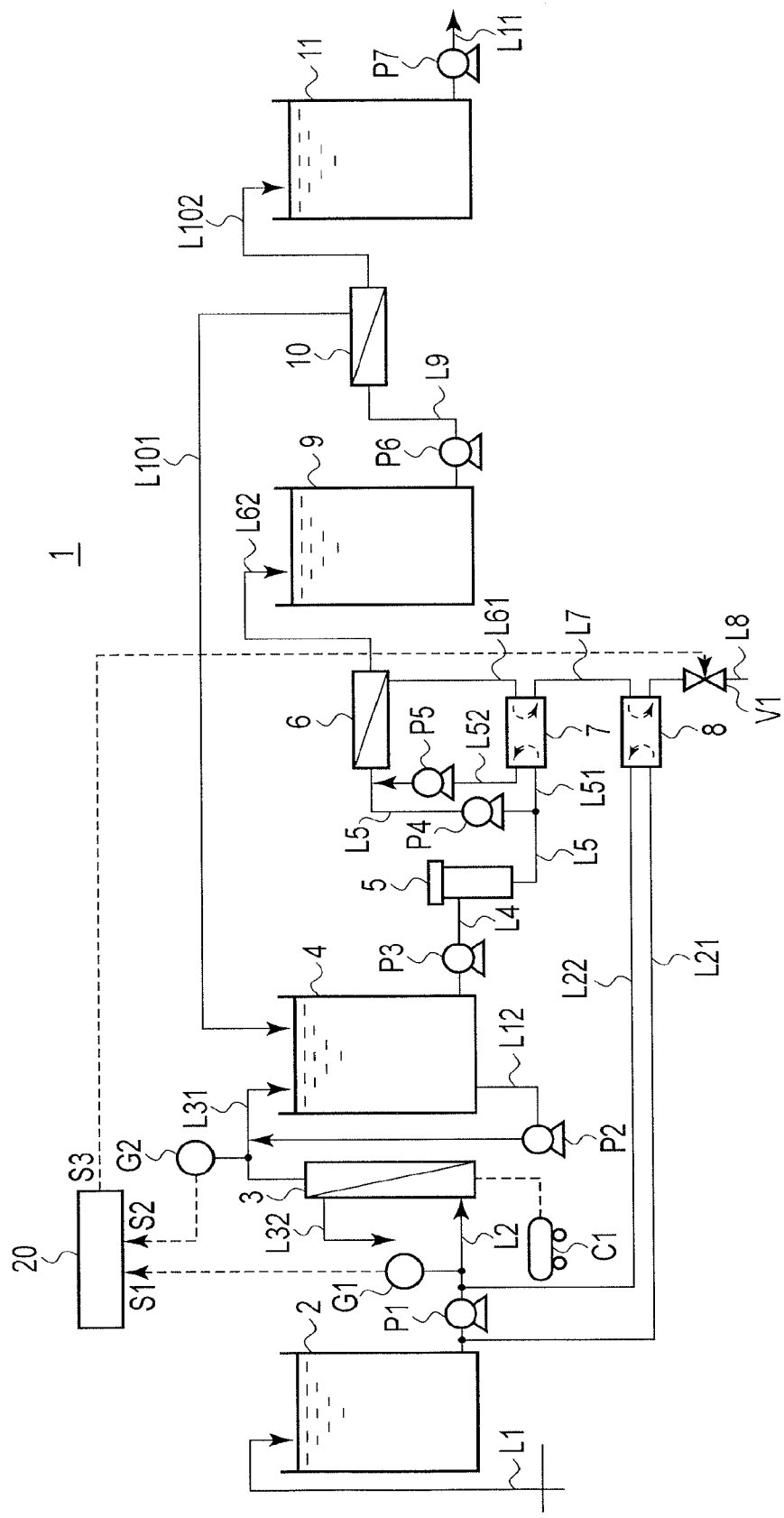
F I G. 1

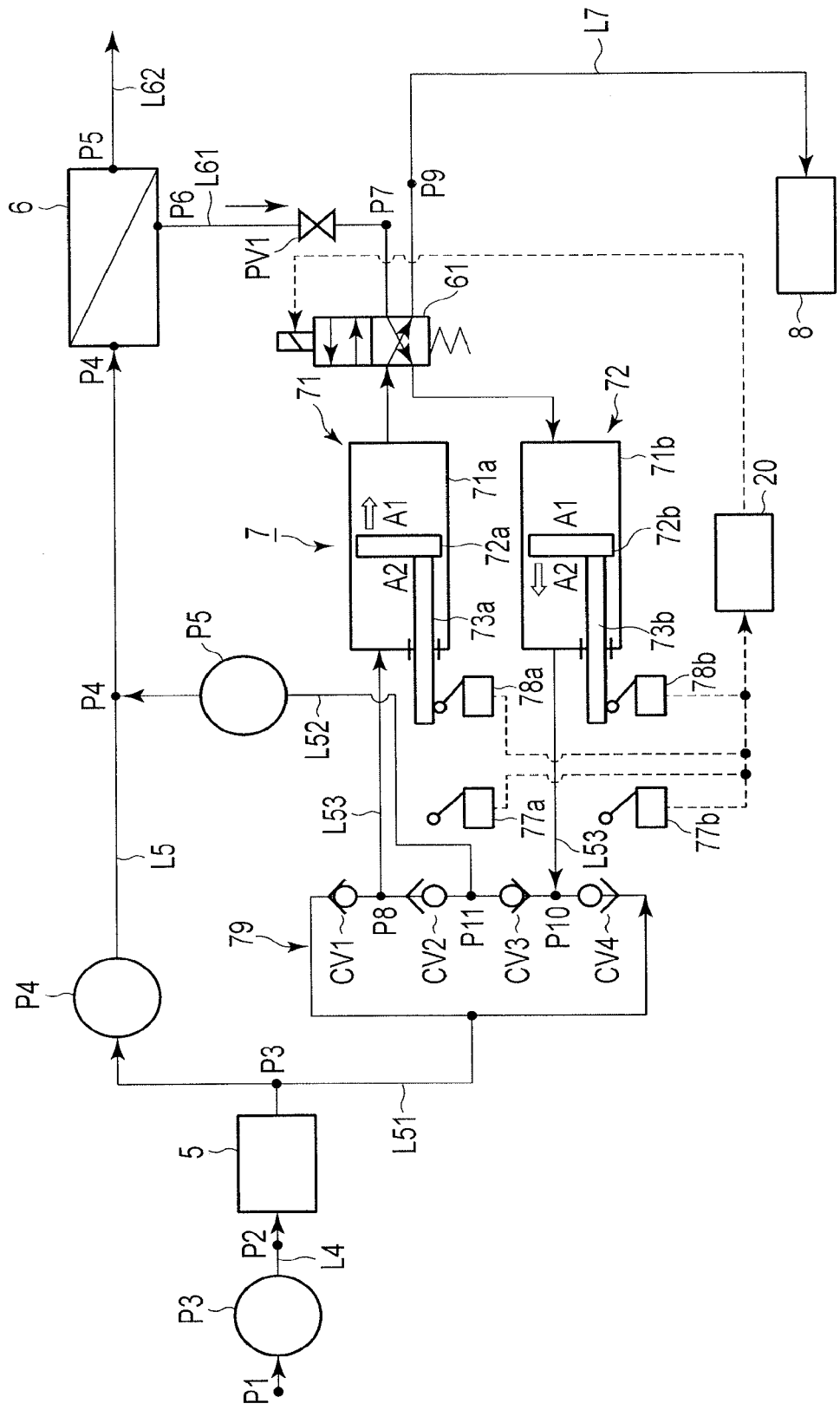
F I G. 3

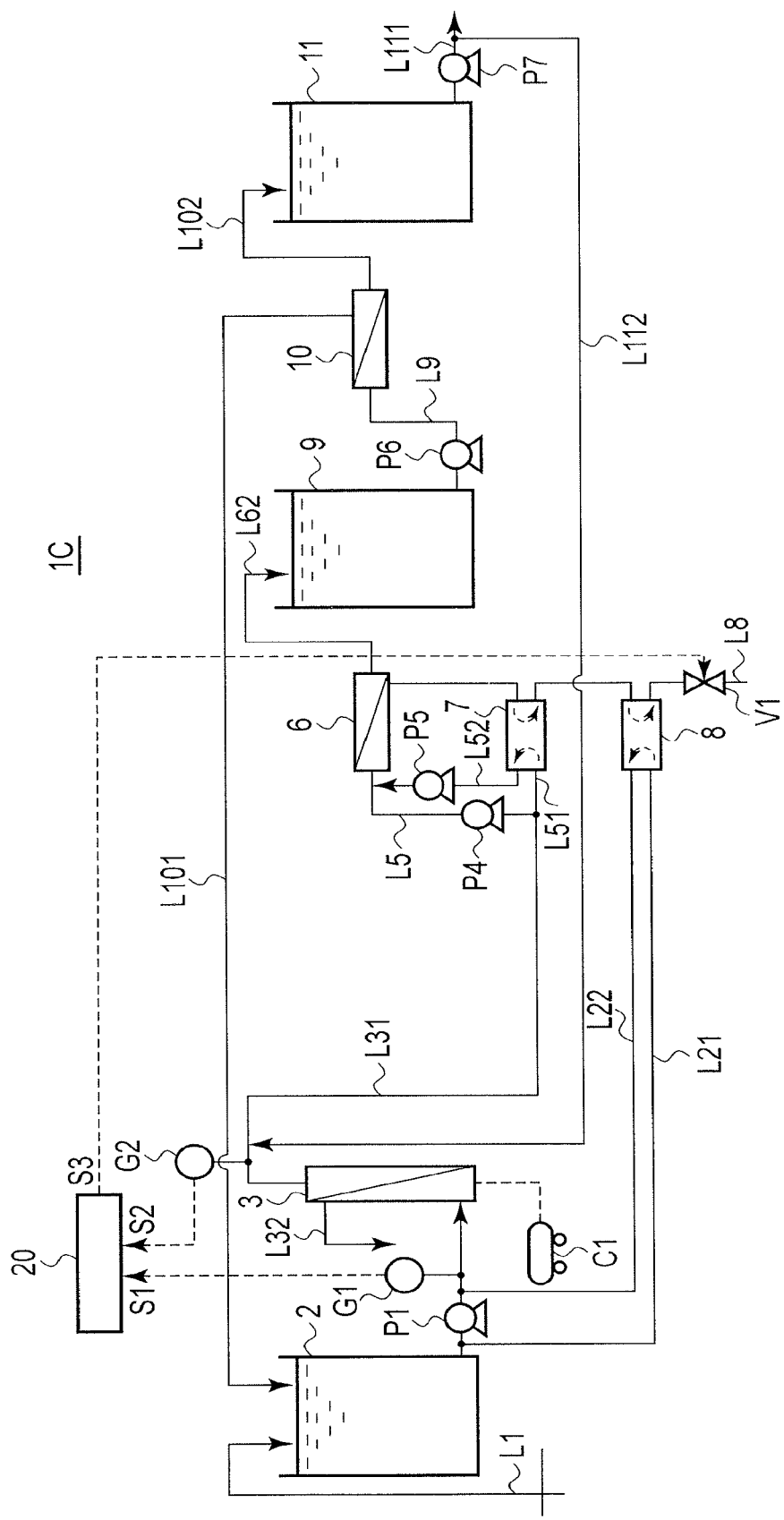
F I G. 8

MEMBRANE FILTRATION SYSTEM

CROSS-REFERENCE TO RELATED APPLICATIONS

This is a continuation of U.S. application Ser. No. 13/186,177, filed Jul. 19, 2011, which claims the benefit of priority from prior Japanese Patent Application No. 2010-207175, filed Sep. 15, 2010, both of which are incorporated herein by reference in their entirety.

FIELD

Embodiments described herein relate generally to a membrane filtration system that filters brackish water, sea water, ground water, landfill leachate, industrial wastewater and the like containing a solute such as ions and salts by a reverse osmosis membrane module.

BACKGROUND

In the field of water treatment, membrane filtration by a reverse osmosis membrane module is used as a method of obtaining domestic water, industrial water, and agricultural water from brackish water, sea water, ground water, landfill leachate, industrial wastewater and the like containing a solute such as ions and salts. The reverse osmosis membrane (RO membrane) is a membrane having a property of allowing water molecules to pass through, but does not allow impurities such as ions and salts to pass through and separates water from solutes by a pressure equal to or more than the osmotic pressure in accordance with the solute density being applied thereto. A membrane filtration system that uses such an RO membrane provides pretreatment to remove insoluble components such as turbidity, algae, and microbes contained in the intake sea water before desalination by passing the sea water through an RO membrane module. The sand filtration in which sea water is caused to permeate through a sand filled layer is commonly used for the pretreatment. However, if an attempt is made to obtain clearer pretreated water to maintain permeation performance of an RO membrane module, the sand filtration has low clarification performance and is not effective.

As an effective pretreatment method in a water treatment system, a membrane module having a microfiltration membrane (MF membrane) and/or an ultrafiltration membrane (UF membrane) is used.

In a conventional system, however, if a membrane module such as an MF membrane or UF membrane is used for pretreatment of an RO membrane module, a pressure pump to feed sea water to the MF membrane/UF membrane module (pretreatment membrane module) by applying pressure is further needed. Thus, power costs of the added pressure pump are further added to a system that uses a membrane module for pretreatment and therefore, compared with a system that uses the sand filtration for pretreatment, power costs become higher, increasing total operation costs.

BRIEF DESCRIPTION OF THE DRAWINGS

FIG. 1 is a configuration block diagram showing a membrane filtration system according to a first embodiment;

FIG. 3 is a block circuit diagram showing the hydraulic circuit containing the preceding power recovery unit when a channel is switched;

FIG. 8 is a configuration block diagram showing the membrane filtration system according to a fourth embodiment;

DETAILED DESCRIPTION

Figure 2:
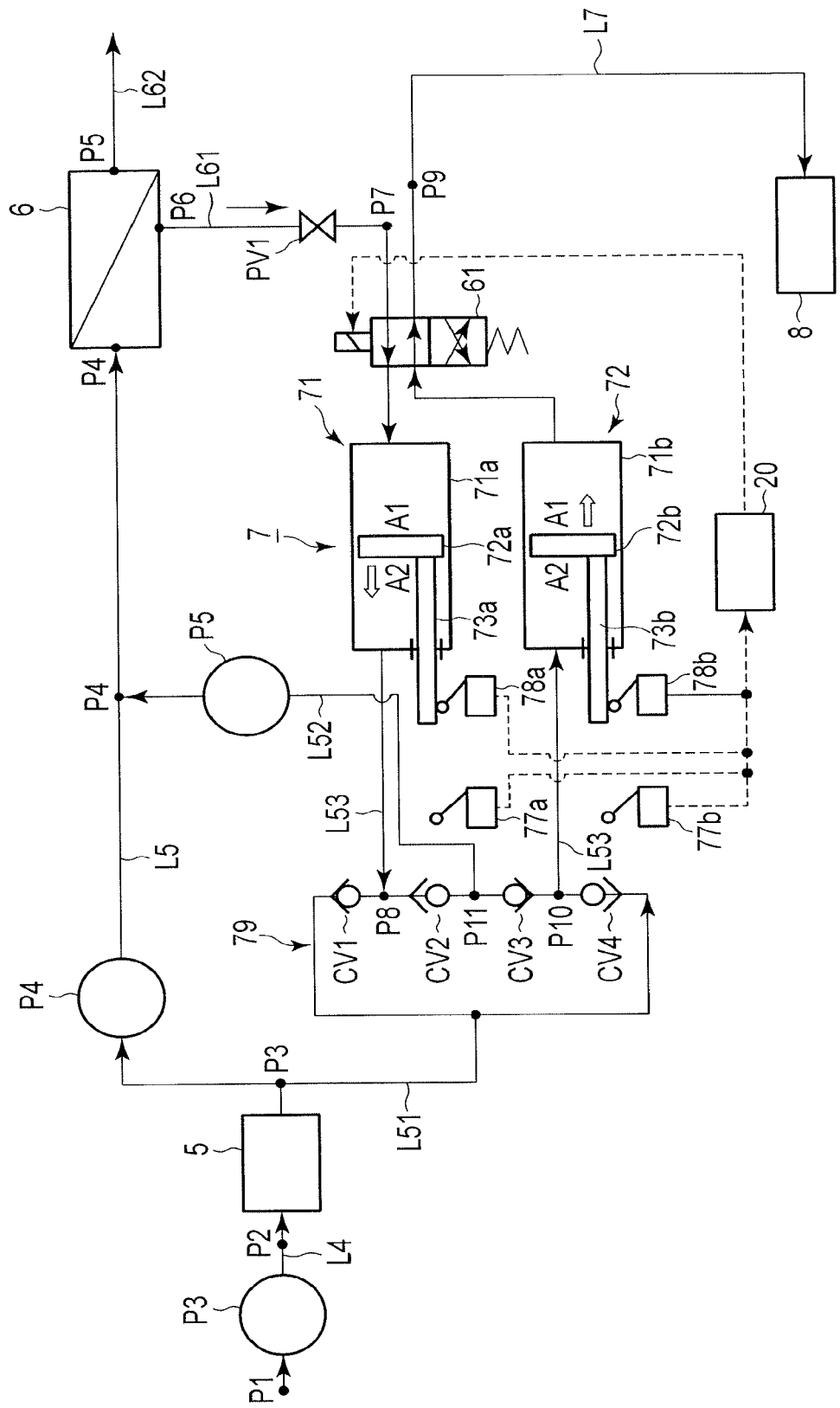
FIG. 2 is a block circuit diagram showing a hydraulic circuit containing a preceding power recovery unit.

Various embodiments will be described hereinafter with reference to the accompanying drawings.

(1) A membrane filtration system according to an embodiment includes (A) a raw water tank 2 configured to accommodate a raw water containing solutes and insoluble components, (B) a pretreatment membrane module 3 that separates and removes the insoluble components from the raw water fed from the raw water tank, (C) a raw water feed line L2 having a raw water feed pump P1 to feed the raw water from the raw water tank to the pretreatment membrane module, (D) a high-pressure reverse osmosis membrane module 6 provided in a subsequent stage of the pretreatment membrane module to separate and remove the solutes from pretreated water providing treated water as permeate and concentrate as retentate, (E) a low-pressure reverse osmosis membrane module 10 provided in the subsequent stage of the high-pressure reverse osmosis membrane module and to which a pressure lower than that applied to the high-pressure reverse osmosis membrane module is applied to separate and remove remaining solutes from the treated water, (F) a high-pressure line L5 having a high-pressure pump P4 to feed the pretreated water to the high-pressure reverse osmosis membrane module at predetermined high pressure, (G) a preceding power recovery unit 7 having a positive-displacement pump (71,72) to which a portion of each of the concentrate and the pretreated water are fed and which pressurize the pretreated water by transmitting the pressure of the concentrate to the pretreated water, (H) a succeeding power recovery unit 8 having a positive-displacement pump (81,82) to which a portion of each of the concentrate from the preceding power recovery unit and the raw water are fed and which pressurize the raw water by transmitting a remaining pressure of the concentrate to the raw water, (I) a concentrate discharge line L61 through which the concentrate discharged from the high-pressure reverse osmosis membrane module flows to transmit the pressure of the discharged concentrate to the positive-displacement pump of the preceding power recovery unit, (J) a communicating line L7 communicating the preceding power recovery unit 7 and the succeeding power recovery unit 8 and through which the concentrate from the preceding power recovery unit flows, (K) a first pressure transmission line L52 branched from the high-pressure line L5 and communicating to the preceding power recovery unit 7 and through which a portion of the pretreated water to be fed to the high-pressure reverse osmosis membrane module flows, (L) a second pressure transmission line L22 branched from the raw water feed line L2 and communicating to the succeeding power recovery unit 8 and through which a portion of the raw water to be fed to the pretreatment membrane module flows, (M) a drain line L8 to discharge the concentrate from the preceding power recovery unit 8, and (N) a pressure regulating valve V1 provided in the drain line L8 to regulate a discharge of the concentrate from the succeeding power recovery unit in accordance with a pressure loss in the pretreatment membrane module.

In the membrane filtration system in an embodiment, a feed pressure of the pretreated water by the high-pressure pump P4 is transmitted to the power recovery unit 7 in the previous stage via the first pressure transmission line L52, the transmitted pressure is recovered by the power recovery unit 7, and the recovered pressure is provided to the pretreated water flowing through the high-pressure line L5 upstream of the high-pressure reverse osmosis membrane module via the first pressure transmission line L52. The remaining pressure of the concentrate from the power recovery unit 7 in the previous stage is transmitted to the power recovery unit 8 in the subsequent stage via the communicating line L7 and the transmitted pressure is recovered by the power recovery unit 8. The recovered pressure is provided to the raw water flowing through the raw water feed line L2 upstream of the pretreatment membrane module via the second pressure transmission line L22 (FIGS. 1 and 4 to 10).

According to the membrane filtration system in an embodiment, the pressure recovered from the preceding power recovery unit 7 is applied to an upstream line of a reverse osmosis membrane module to reduce power of the high-pressure pump P4 and also the recovered pressure recovered from the succeeding power recovery unit 8 is applied to the upstream line of the pretreatment membrane module to reduce power of the raw water feed pump P1 and therefore, total running costs can significantly be reduced. In this case, switching control of the pressure regulating valve V1 is exercised in accordance with a pressure loss ΔP in the pretreatment membrane module 3, the pressure of the concentrate discharged from the succeeding power recovery unit 8 is regulated to regulate the recovered pressure transmitted from the succeeding power recovery unit, and the regulated recovered pressure is added to increase the feed pressure of raw water.

(2) In the membrane filtration system described in (1), it is preferable to further include a first manometer G1 that measures a pressure P17 upstream of the pretreatment membrane module, a second manometer G2 that measures a pressure P18 downstream of the pretreatment membrane module, and a controller 20 that determines a membrane differential pressure ΔP of the pretreatment membrane module from measured pressures of the first and second manometers, regulates the pressure of the concentrate discharged from the high-pressure reverse osmosis membrane module by opening the pressure regulating valve V1 if the determined membrane differential pressure ΔP is smaller than or equal to a set pressure value Pc, and maintains the pressure regulating valve V1 closed if the determined membrane differential pressure ΔP is larger than the set pressure value Pc.

Figure 5:
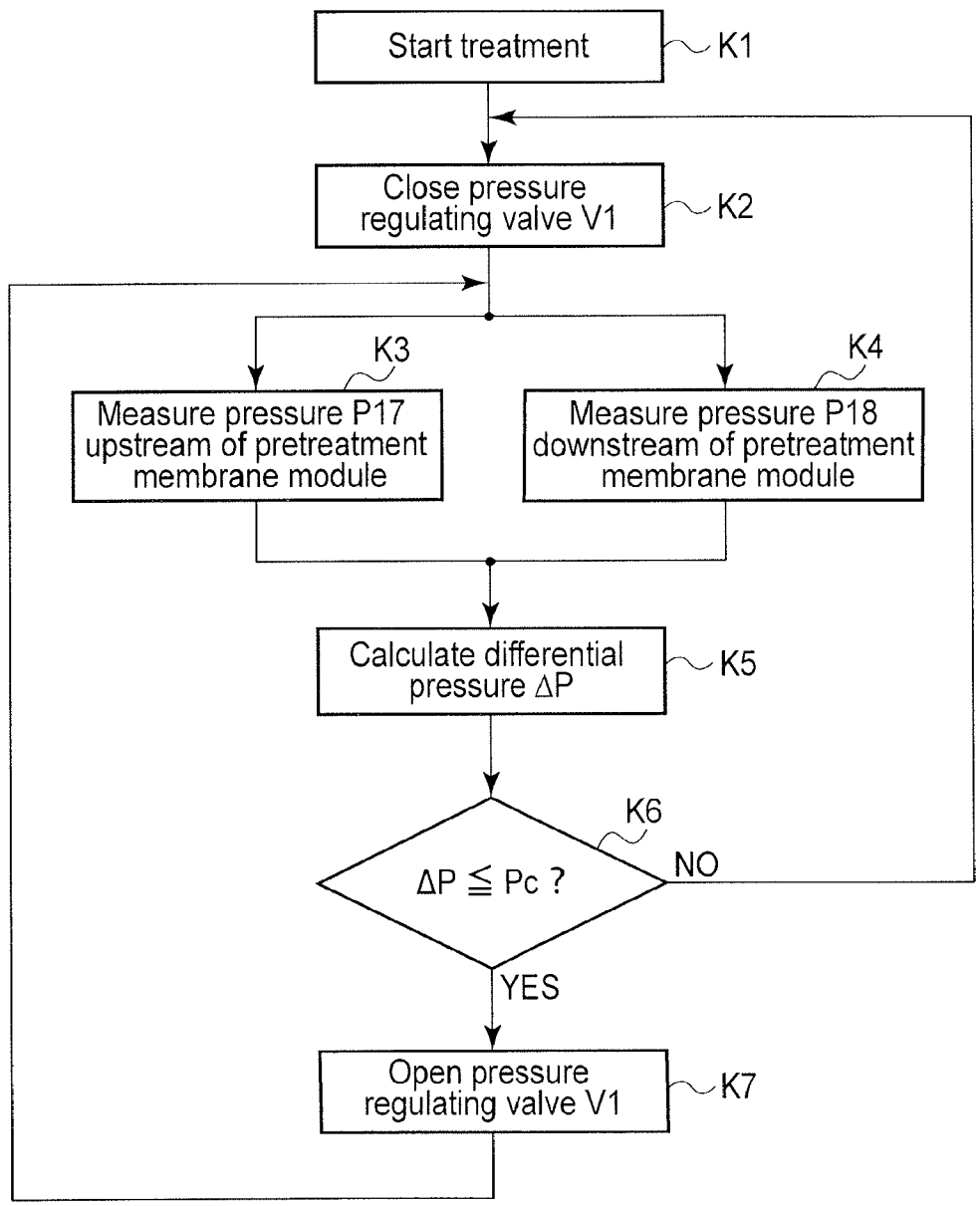
FIG. 5 is a flow chart illustrating control of a line pressure by switching control of a pressure regulating valve.

In the membrane filtration system in an embodiment, the pressure P17 upstream of the pretreatment membrane module is measured by the first manometer G1 and the pressure P18 downstream of the pretreatment membrane module is measured by the second manometer G2 to determine a differential pressure of the both measured pressures P17, P18 and if the determined membrane differential pressure ΔP is smaller than or equal to the set pressure value Pc, the pressure regulating valve V1 is opened to regulate the pressure of the brine discharged from the reverse osmosis membrane module to a desired value (FIGS. 5, 1). If the determined membrane differential pressure ΔP is larger than the predetermined set pressure value Pc, pressures on the upstream and downstream sides are measured again while the pressure regulating valve V1 is closed to continue the calculation of the membrane differential pressure.

If the solute concentration of the concentrate upstream of the high-pressure reverse osmosis membrane module increases with the passage of processing time, the osmotic pressure rises and both the load of the RO membrane and the load of the high-pressure pump P4 become excessive. However, according to the membrane filtration system in the present embodiment, the concentrate can be discharged from the high-pressure reverse osmosis membrane module at appropriate solute concentration so that processing efficiency of the high-pressure RO membrane module can be improved without damaging the RO membrane and the high-pressure pump P4.

(3) In the membrane filtration system described in (1), it is preferable to further include a treated water tank arranged in the subsequent stage of the pretreatment membrane module to accommodate the pretreated water having passed through the pretreatment membrane module, a water conveyance line L4 having a conveying pump P3 to feed the pretreated water from the treated water tank to the high-pressure pump, and a back washing line L42 branched from the water conveyance line L4 and communicating to the pretreatment membrane module, to guide the pretreated water to the pretreatment membrane module 3 by driving of the conveying pump P3.

Figure 6:
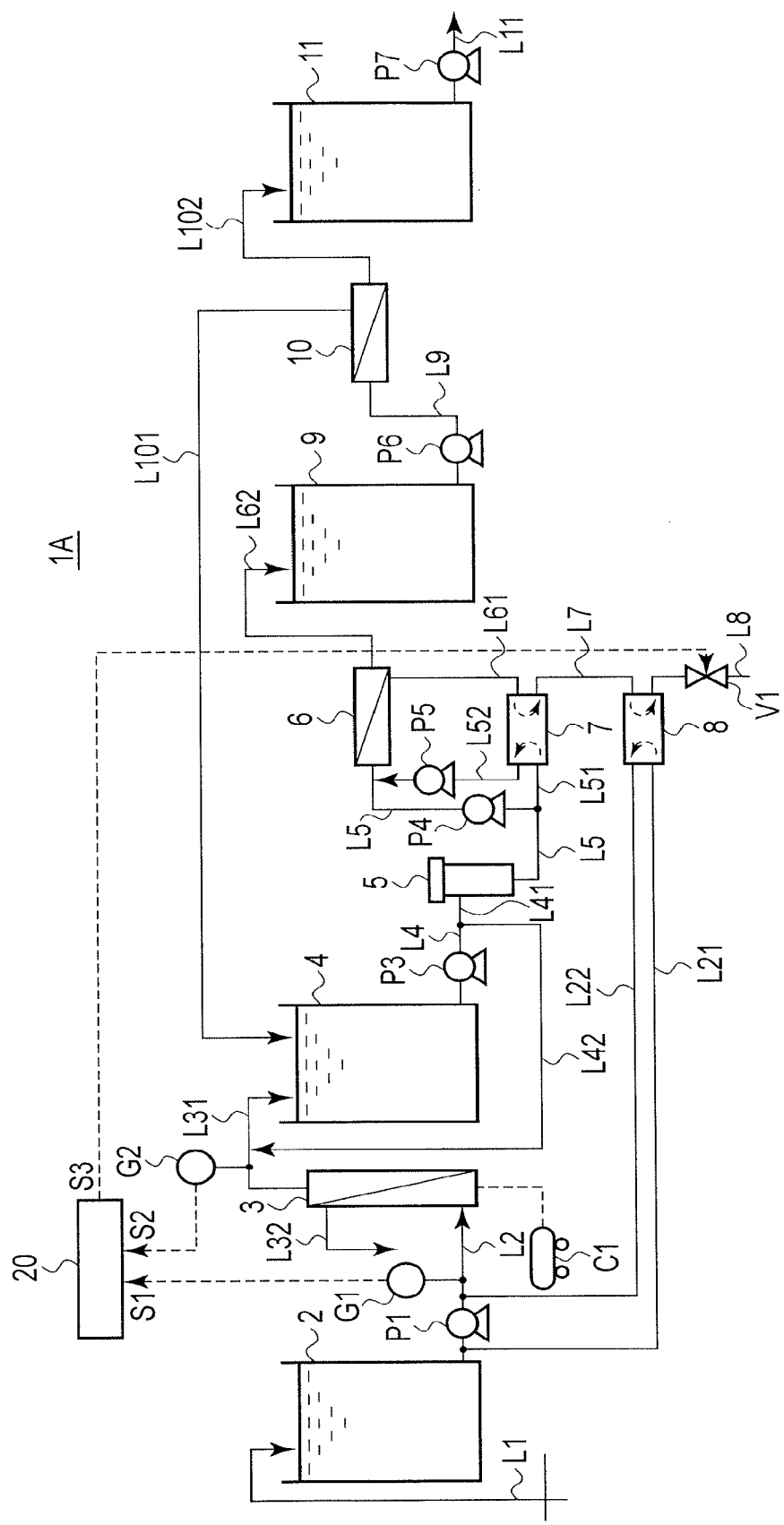
FIG. 6 is a configuration block diagram showing the membrane filtration system according to a second embodiment.

In the membrane filtration system in the present embodiment, the pretreated water is temporarily accommodated in a treated water tank 4, the channel is switched from the water conveyance line L4 to the back washing line L42 by a switching valve, and the pretreated water is fed from the treated water tank 4 to the pretreatment membrane module 3 through the back washing line L42 by driving of the conveying pump P3 to reversely clean a membrane filter in the pretreatment membrane module by the pretreated water (FIG. 6).

According to the membrane filtration system in an embodiment, the pretreated water generated in a system can be used as back washing water without newly introducing back washing water from outside the system and therefore, the membrane filter in the pretreatment membrane module can be cleaned at low cost.

(4) In the membrane filtration system described in (1), it is preferable to further include a direct transfer line L31 connected to the high-pressure line to directly guide the pretreated water having passed through the pretreatment membrane module to the high-pressure reverse osmosis membrane module, a treated water tank 9 that accommodates the treated water having passed through the high-pressure reverse osmosis membrane module, a water conveyance line L91 having a low-pressure pump P6 to feed the treated water from the treated water tank to the low-pressure reverse osmosis membrane module, and a back washing line L92 branched from the water conveyance line and communicating to the pretreatment membrane module, to guide the treated water to the pretreatment membrane module by driving of the conveying pump.

Figure 7:
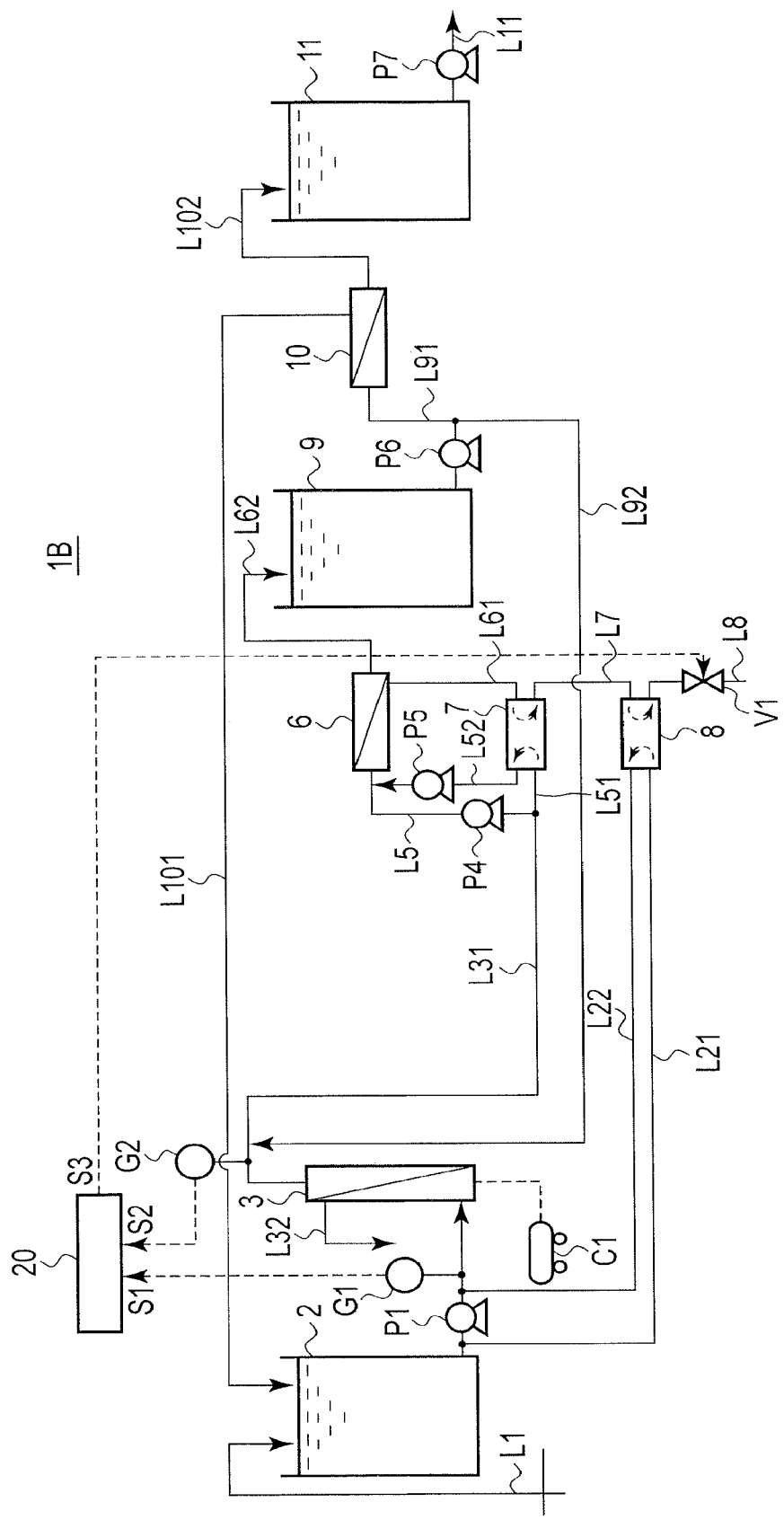
FIG. 7 is a configuration block diagram showing the membrane filtration system according to a third embodiment.

In the membrane filtration system in an embodiment, the treated water having passed through the reverse osmosis membrane module is sent from the high-pressure reverse osmosis membrane module 6 to the treated water tank 9 via the direct transfer line L31 to temporarily accommodate the treated water in the treated water tank 9, the treated water is sent to the reverse osmosis membrane module 10 in the second or subsequent stage via the water conveyance line L91 by driving of the low-pressure pump P6 for normal treatment, and the channel is switched from the water conveyance line L91 to the back washing line L92 and the treated water is sent to the pretreatment membrane module 3 via the back washing line L92 by driving of the low-pressure pump P6 to reversely clean the membrane filter of the pretreatment membrane module 3 for back washing treatment (FIG. 7).

According to the membrane filtration system in an embodiment, the pretreated water generated in a system can be used as back washing water without newly introducing back washing water from outside the system and therefore, the membrane filter in the pretreatment membrane module can be cleaned at low cost.

(5) In the membrane filtration system described in (1), wherein there are a plurality of succeeding reverse osmosis membrane modules, and it is preferable to further include a treated water tank 11 that accommodates product water having passed through the last stage, succeeding reverse osmosis membrane module 10; a water conveyance line L111 having a conveying pump P7 to send out the product water from the treated water tank; and a back washing line L112 communicating to the pretreatment membrane module by being branched from the water conveyance line to guide the treated water to the pretreatment membrane module by driving of the conveying pump.

In the membrane filtration system in the present embodiment, the product water is temporarily accommodated in the treated water tank 11 and the product water is fed to the pretreatment membrane module 3 from the treated water tank 11 via the back washing line L112 by driving of the conveying pump P7 to reversely clean the membrane filter in the pretreatment membrane module by the product water (FIG. 8).

According to the membrane filtration system in an embodiment, the product water produced in a system can be used as back washing water without newly introducing back washing water from outside the system and therefore, the membrane filter in the pretreatment membrane module can be cleaned at low cost.

(6) In the membrane filtration system described in (1), it is preferable to further include a concentrate tank 23 that accommodates the concentrate discharged from the high-pressure reverse osmosis membrane module and a back washing line L82 having a washing pump P8 to feed the concentrate from the concentrate tank to the pretreatment membrane module.

Figure 9:
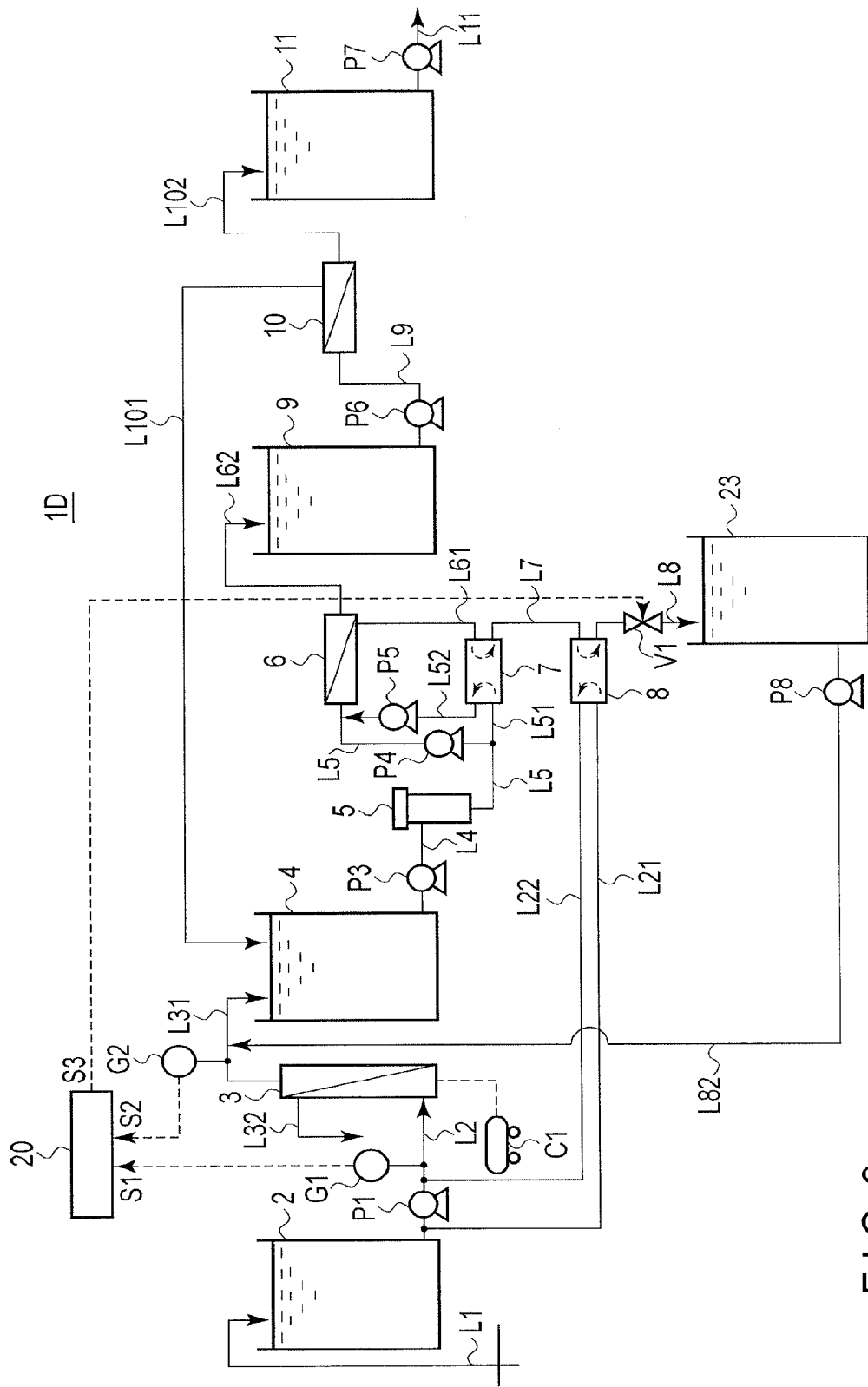
FIG. 9 is a configuration block diagram showing the membrane filtration system according to a fifth embodiment.

In the membrane filtration system in an embodiment, the concentrate discharged from the reverse osmosis membrane module is temporarily accommodated in the concentrate tank 23 and the concentrate is fed from the concentrate tank 23 to the pretreatment membrane module 3 through the back washing line L82 by driving of the washing pump P8 to reversely clean the membrane filter in the pretreatment membrane module by the concentrate (FIG. 9).

According to the membrane filtration system in an embodiment, the concentrate generated in a system can be used as back washing water without newly introducing back washing water from outside the system and therefore, the membrane filter in the pretreatment membrane module can be cleaned at low cost.

(7) In the membrane filtration system described in (1), it is preferable to further include a hot water tank that accommodates hot water, a cleaning line provided between at least one of the pretreatment membrane module, the high-pressure reverse osmosis membrane module and the low-pressure reverse osmosis membrane module, and the hot water tank and having a conveying pump to feed the hot water to at least one of the pretreatment membrane module, the high-pressure reverse osmosis membrane module, and the low-pressure reverse osmosis membrane module, and a controller that controls driving of the conveying pump at preset intervals or in preset timing to cause the conveying pump to feed the hot water to at least one of the pretreatment membrane module, the high-pressure reverse osmosis membrane module, and the low-pressure reverse osmosis membrane module.

Figure 10:
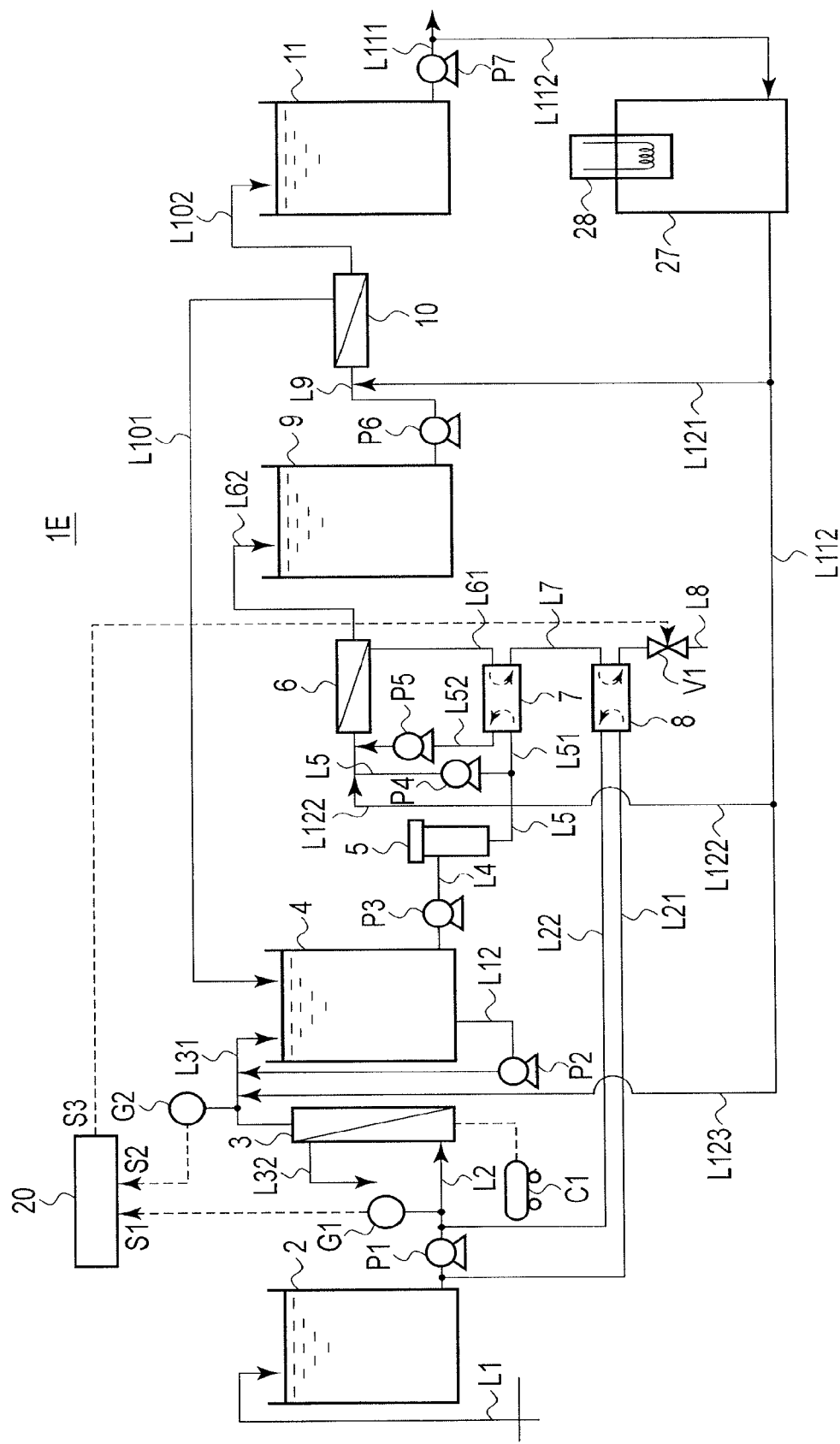
FIG. 10 is a configuration block diagram showing the membrane filtration system according to a sixth embodiment.

In the membrane filtration system in an embodiment, the channel is switched from the water conveyance line L111 to the back washing line L112 by a switching valve and the hot water is fed from a hot water tank 27 to the pretreatment membrane module 3 through the back washing line L112 by driving of the conveying pump P7 to reversely clean the membrane filter in the pretreatment membrane module by the hot water (FIG. 10).

According to the membrane filtration system in an embodiment, by doing, in addition to normal cleaning, back washing with hot water whose temperature is higher than that of normal cleaning water periodically, clogging of the membrane filter can efficiently be eliminated in a short time so that total running costs can be reduced by reducing the rise in pressure of the pretreatment membrane module and the reverse osmosis membrane module.

Various embodiments will each be described hereinafter with reference to the accompanying drawings.

First Embodiment

The first embodiment will be described with reference to FIGS. 1 to 5.

As shown in FIG. 1, a membrane filtration system 1 according to the first embodiment includes a raw water tank 2, a raw water feed pump P1, a pretreatment membrane module 3, a first treated water tank 4, a conveying pump P3, a protector filter 5, a high-pressure pump P4, a high-pressure reverse osmosis membrane module 6 in the first stage, a second treated water tank 9, a low-pressure pump P6, a low-pressure reverse osmosis membrane module 10 in the second stage, a third treated water tank 11, and a conveying pump P7. These apparatuses and devices are arranged in series in order from the upstream side on the main lines L1 to L11. Further, the membrane filtration system 1 includes, as peripheral equipment, a compressor C1, a first manometer G1, a second manometer G2, a washing pump P2, a preceding power recovery unit 7, a succeeding power recovery unit 8, a booster pump P5, a pressure regulating valve V1, various valves (not shown), and a controller 20. The membrane filtration system 1 is controlled by the controller 20 in a unified fashion.

The raw water tank 2 accommodates sea water pumped up from the sea by driving of a storage pump (not shown) via the like L1 communicatively connected into the sea as the raw water. The pressure line L2 having the pump P1 is connected to the outlet of the raw water tank 2 so that the raw water is sent at predetermined pressure from the raw water tank 2 to the pretreatment membrane module 3 via the line L2 by driving of the raw water feed pump P1.

The pretreatment membrane module 3 contains an MF membrane or UF membrane that partitions the inside thereof into the retentate side and the permeate side. On the retentate side of the pretreatment membrane module 3, the raw water feed line L2, a compressed air feed line from the compressor C1, and a discharge line L32 are each communicated. The direct transfer line L31 is directly communicated to the permeate side of the pretreatment membrane module 3. The raw water is introduced into the pretreatment membrane module 3 through the raw water feed line L2 and passed through the MF membrane or UF membrane before being sent to the first treated water tank 4 through the direct transfer line L31 as pretreated water from which solid content (such as sand and suspended solids) has been removed.

The first manometer G1 is mounted on the line L2 on the upstream side (retentate side) of the pretreatment membrane module 3. The first manometer G1 measures the pressure P17 on the upstream side of the pretreatment membrane module 3 and sends a measurement signal S1 thereof to the controller 20. The second manometer G2 is mounted on the line L31 on the permeate side of the pretreatment membrane module 3. The second manometer G2 measures the pressure P18 on the downstream side (permeate side) of the pretreatment membrane module 3 and sends a measurement signal S2 thereof to the controller 20. Based on the input signals S1, S2, the controller 20 determines the upstream side measured pressure P17 and the downstream side measured pressure P18, respectively, calculates the difference $\Delta P$ from the both measured pressures P17, P18, and sends a control signal S3 corresponding to the calculated difference $\Delta P$ to a drive power supply of the pressure regulating valve V1 described later.

The first treated water tank 4 is a reservoir to accommodate the pretreated water membrane-filtered by the pretreatment membrane module 3. The outlet of the first treated water tank 4 is connected to the water conveyance line L4 having the pump P3 and communicates to the protector filter 5 via the line L4. A back washing line L12 having the pump P2 is connected to a lower part of the first treated water tank 4. The back washing line L12 is connected to an appropriate position of the direct transfer line L31. The pretreated water from the first treated water tank 4 is fed to the downstream side of the pretreatment membrane module 3 by passing through the lines L12→L31 by driving of the washing pump P2 so that the clogged MF membrane or UF membrane is reversely cleaned.

The protector filter 5 is provided between the first treated water tank 4 and the high-pressure reverse osmosis membrane module 6 to remove foreign matter from the pretreated water sent from the first treated water tank 4 so that foreign matter such as solid content is prevented from infiltrating into the high-pressure reverse osmosis membrane module 6. The protector filter 5 is filled with filter elements, the water conveyance line L4 is connected to the inlet of the protector filter 5, and the high-pressure line L5 is connected to the outlet of the protector filter 5.

The high-pressure pump P4 is mounted on the high-pressure line L5 so as to feed water having passed through the protector filter 5 to the high-pressure reverse osmosis membrane module 6 at predetermined high pressure P4 (for example, 6 MPa). Various types of pumps such as a reciprocating pump and volute pump can be used as the high-pressure pump P4.

The high-pressure reverse osmosis membrane module 6 contains a RO membrane that partitions the inside thereof into the retentate side and the permeate side. The high-pressure line L5 and the concentrate discharge line L61 are connected to the retentate side of the high-pressure RO membrane module 6. A water conveyance line L62 is connected to the permeate side of the high-pressure RO membrane module 6.

The high-pressure line L5 is branched into two. That is, a line L51 is branched from the main line L5 communicating to the high-pressure RO membrane module 6 via the high-pressure pump P4. As shown in FIGS. 2 and 3, the branch line L51 communicates to a high-pressure side chamber (space on one side inside cylinders 71a, 71b partitioned by pistons 72a, 72b) of the positive-displacement pumps 71, 72 of the preceding power recovery unit 7 in the previous stage and forms a first transmission line to transmit pressure from the pretreated water (pretreated sea water) to the pistons 72a, 72b.

Another first pressure transmission line L53 communicates to a low-pressure side chamber (space on the other side inside the cylinders 71a, 71b partitioned by the pistons 72a, 72b) of the cylinders 71a, 71b of the preceding power recovery unit 7. The first pressure transmission line L53 merges with the high-pressure line L5 via a pressure transmission circuit 79 and the other pressure transmission line L52 to transmit the recovered pressure to the upstream side of the high-pressure RO membrane module 6. The booster pump P5 of the line L52 supplements an insufficient pressure of the recovered pressure by the power recovery unit 7 in the previous stage and is an optional device that can be omitted if a sufficient pressure can be recovered by the preceding power recovery unit 7.

The concentrate discharge line L61 communicates to a 4-port switching valve 61 of the preceding power recovery unit 7 in the previous stage. The concentrate discharge line L61 guides concentrate discharged from the upstream side of the high-pressure RO membrane module 6 to the preceding power recovery unit 7 so that high pressure held by the concentrate is transmitted to the pistons 72a, 72b.

The communicating line L7 is provided between the 4-port switching valve 61 of the preceding power recovery unit 7 and a 4-port switching valve 62 of the succeeding power recovery unit 8. The communicating line L7 is a pressure transmission channel to cause raw water on the side of the succeeding power recovery unit 8 to recover pressure energy of concentrate (brine) discharged from the preceding power recovery unit 7.

The second pressure transmission line L22 is provided between the low-pressure side chamber of the succeeding power recovery unit 8 and the line L2 downstream of the pump P1. A raw water introduction line L21 is provided between the line L2 upstream of the pump P1 and the low-pressure side chamber of the succeeding power recovery unit 8. The raw water introduced into the low-pressure side chamber of the succeeding power recovery unit 8 from the line L21 has pressure energy transmitted from a pressurized fluid (brine) in the high-pressure side chamber via the pistons 82a, 82b and the pressure energy is given to the raw water flowing through the line L2 via the second pressure transmission line L22.

The drain line L8 is provided between the high-pressure side chamber of the succeeding power recovery unit 8 and a concentrate tank (not shown) via the pressure regulating valve V1. The drive power supply of the valve V1 is controlled by the controller 20. That is, when the control signal S3 from the controller 20 is received, the valve V1 opens to discharge concentrate into the atmospheric pressure. The pressure control signal S3 is determined by the controller 20 based on the two pressure measurement signals S1, S2. Details thereof will be described later with reference to FIG. 5.

A permeate side space of the high-pressure RO membrane module 6 communicates to the second treated water tank 9 via the water conveyance line L62. That is, primary treated water having permeated through the RO membrane is sent from the RO membrane module 6 to the second treated water tank 9 via the line L62.

The second treated water tank 9 is a reservoir to accommodate primary treated water having been membrane-filtered by the high-pressure RO membrane module 6. The outlet of the second treated water tank 9 is connected to a line L9 having the low-pressure pump P6 and communicates to the upstream side of the low-pressure RO membrane module 10 via the line L9. The low-pressure pump P6 applies a pressure lower than the predetermined high pressure P4 (6 MPa) applied to a fluid by the high-pressure pump P4 to a fluid.

Two lines L101, L102 communicate to the permeate side of the low-pressure RO membrane module 10. One line L101 communicates to the first treated water tank 4. The other line L102 communicates to the third treated water tank 11.

The third treated water tank 11 is a reservoir to accommodate product water (treated water in low solute concentration) treated by the low-pressure RO membrane module 10. The outlet of the third treated water tank 11 is connected to the line L11 having the conveying pump P7 and communicates to a fresh water clarification tank of a product water treater (not shown) via the line L11.

Figure 4:
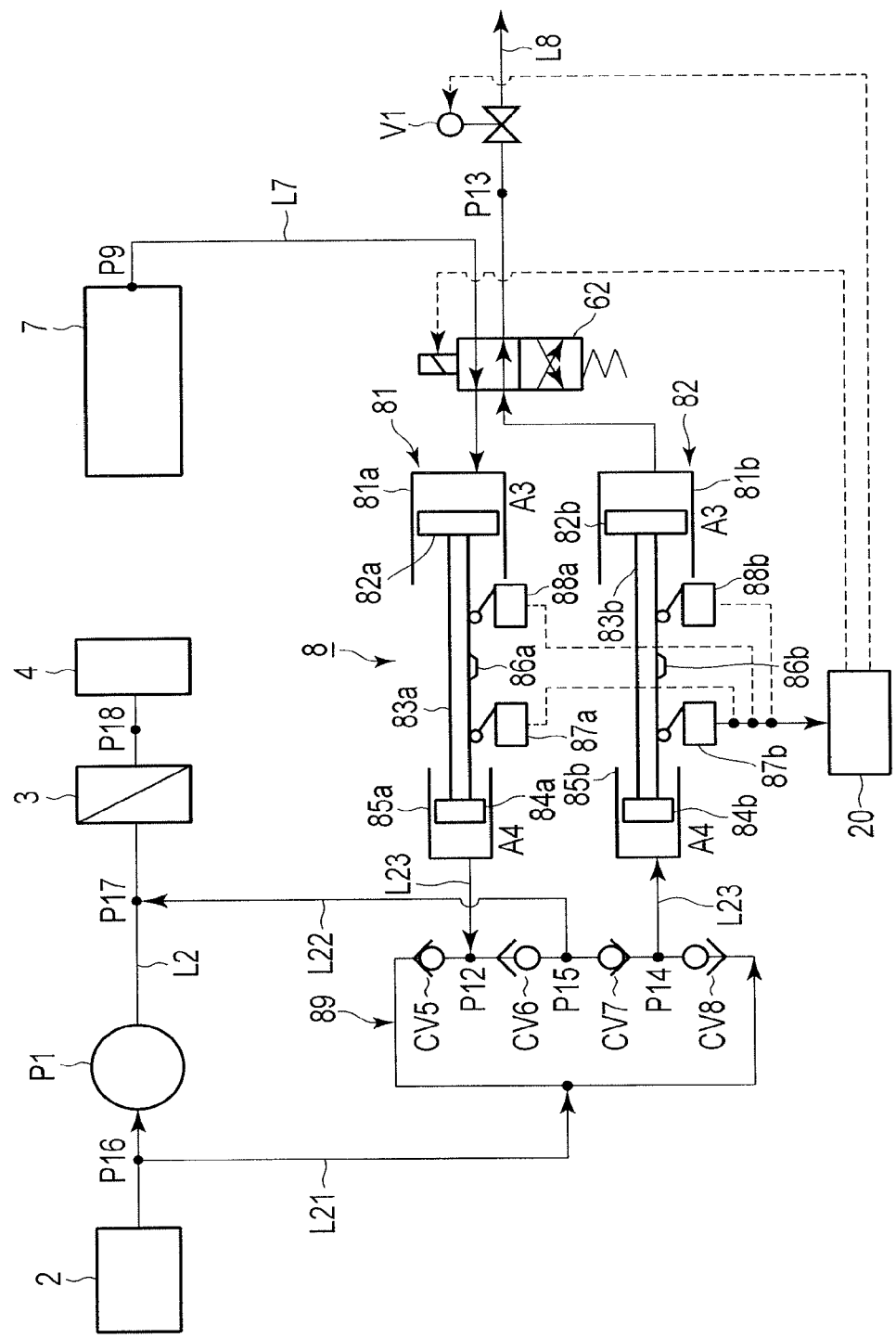
FIG. 4 is a block circuit diagram showing the hydraulic circuit containing the power recovery unit in a subsequent stage.

The power recovery unit in two stages will be described in detail with reference to FIGS. 2 to 4. As shown in FIGS. 2 and 3, the preceding power recovery unit 7 includes a pressure regulating valve PV1, the 4-port switching valve 61, a pair of the positive-displacement pumps 71, 72, two sets of rod position detectors (77a, 78a), (77b, 78b), and the pressure transmission circuit 79 having four check valves CV1, CV2, CV3, CV4. These elements function as a pressure conversion unit that converts the pressure P6 of the concentrate discharged from the high-pressure RO membrane module 6 into an additional pressure P11 added to the pretreated water fed to the high-pressure RO membrane module 6. Of these elements, the pressure regulating valve PV1 and the 4-port switching valve 61 are each controlled by the above controller 20 in operation.

The pressure regulating valve PV1 is provided on the concentrate discharge line L61 upstream of the 4-port switching valve 61 and controls the concentrate (brine) pressure P7 delivered to the 4-port switching valve 61 by limiting the pressure P6 of the brine (high-concentration sea water) discharged from the high-pressure RO membrane module 6. The concentrate discharge pressure P6 from the high-pressure RO membrane module 6 falls with clogging of the RO membrane after long-term usage of the RO membrane. The pressure regulating valve PV1 is used to regulate a decrease of the concentrate discharge pressure P6. With the pressure regulating valve PV1 being controlled by the controller 20, the pressure P11 of the pretreated water output from the power recovery unit 7 in the previous stage and the pressure P4 of the pretreated water output from the high-pressure pump P4 are controlled so as to be always equal.

The 4-port switching valve 61 is arranged on the line L61 downstream of the pressure regulating valve PV1 and switches the inflow of concentrate into the positive-displacement pumps 71, 72 and the discharge of concentrate from the positive-displacement pumps 71, 72 according to the control signal from the controller 20. As the system of switching the 4-port switching valve 61, the pneumatic system, hydraulic system, oil pressure system or solenoid coil based system can be used.

One pair of the positive-displacement pumps 71, 72 is communicatively connected to the retentate side of the high-pressure RO membrane module 6 via the pressure regulating valve PV1 of the line L61 and the 4-port switching valve 61. The first positive-displacement pump 71 and the second positive-displacement pump 72 have substantially the same configuration. The input channel to the pumps 71, 72 is switched by the 4-port switching valve 61 so that the first positive-displacement pump 71 and the second positive-displacement pump 72 are alternately loaded with the concentrate pressure P7. FIG. 2 shows a state in which the first positive-displacement pump 71 is loaded with the concentrate pressure P7. FIG. 3 shows a state in which the second positive-displacement pump 72 is loaded with the concentrate pressure P7.

The first positive-displacement pump 71 includes the cylinder 71a, the piston 72a, and a rod 73a. The cylinder 71a is composed of a container in a cylindrical or rectangular pipe shape to form an enclosed space and the container has a total of three openings, that is, an inlet and an outlet of a pressurized fluid and an insertion port of the rod 73a, formed therein. The piston 72a is supported reciprocatingly slidably inside the cylinder 71a and partitions an internal space of the cylinder 71a into a first space and a second space. A seal ring (not shown) is fitted to an outer circumferential surface of the piston 72a for fluid-tight sealing so that a fluid is not leaked from the first space to the second space in the cylinder 71a. Concentrate (brine) is to be introduced into the first space of the cylinder 71a through the 4-port switching valve 61 of the line L61. Pretreated water is to be fed into the second space of the cylinder 71a through the line L51.

On end of the rod 73a is joined to the piston 72a from the side of the second space and the other end projects to the outside through a seal hole of the cylinder 71a. Because the rod 73a is joined to the piston 72a from the side of the second space of the cylinder 71a, an area A2 where the piston 72a faces the second space of the cylinder 71a is smaller than an area A1 where the piston 72a faces the first space of the cylinder 71a (A2<A1). The ratio of the areas A1, A2 is preset based on the pressure of concentrate from the high-pressure RO membrane module 6, pressure of pretreated water from the high-pressure pump P4, frictional force between the cylinder 71a and the piston 72a, and frictional force between the cylinder 71a and the rod 73a.

One side of the pressure transmission circuit 79 is connected to the protector filter 5 by the branch line L51 and the other side is connected to the cylinders 71a, 71b by the line L53. The pressure transmission circuit 79 includes a loop circuit through which the pretreated water passes from the first treated water tank 4 via the protector filter 5 and four check valves CV1, CV2, CV3, CV4 mounted on the loop circuit. These four check valves CV1, CV2, CV3, CV4 open and close independently in accordance with a pressure difference therearound.

One pair of the detectors 77a, 78a is position detection sensors that detects the position of the rod 73a projecting to the outside from the cylinder 71a of the first positive-displacement pump 71. One detector 77a is mounted in a position allowing the detector 77a to detect the rod 73a when the piston 72a comes close to the left end of the cylinder 71a. The other detector 78a is mounted in a position not allowing the detector 78a to detect the rod 73a when the piston 72a comes close to the right end of the cylinder 71a. When one detector 77a is in a position enabling detection of the rod 73a or the other detector 78a is in a position disabling detection (non-detection state) of the rod 73a, a signal thereof is sent to the controller 20.

The detectors 77b, 78b of the second positive-displacement pump 72 have substantially the same configuration as that of the detectors 77a, 78a of the first positive-displacement pump 71 described above and detect the position of the rod 73b projecting from the cylinder 71b. When one detector 77b is in a position enabling detection of the rod 73b or the other detector 78b is in a position disabling detection (non-detection state) of the rod 73b, a signal thereof is sent to the controller 20.

An overview of the operation of the preceding power recovery unit 7 will be described.

The controller 20 calculates the position of the piston 72a inside the first cylinder 71a based on a signal sent from the first detectors 77a, 78a, and also calculates the position of the piston 72b inside the second cylinder 71b based on a signal sent from the second detectors 77b, 78b. Based on the calculated positions of the first and second pistons 72a, 72b, the controller 20 determines whether to cause the 4-port switching valve 61 to perform a switching operation and if the controller 20 determines to cause the 4-port switching valve 61 to perform a switching operation, the controller 20 sends an instruction signal thereof to the 4-port switching valve 61.

If detection signals are received from the detectors 77a, 78b, the controller 20 determines that the first piston 72a is positioned near the left end of the first cylinder 71a and the second piston 72b is positioned near the right end of the second cylinder 71b and outputs a signal to the switching valve 61 to cause the switching valve 61 to discharge concentrate from the first positive-displacement pump 71 and to feed the concentrate to the second positive-displacement pump 72. The transmission path of concentrate pressure in this operation is: module 6→line L61→switching valve 61→second pump 72→line L53→check valve CV3→line L52→line L5→module 6 (FIG. 3).

On the other hand, if detection signals are received from the detectors 78a, 77b, the controller 20 determines that the first piston 72a is positioned near the right end of the cylinder 71a and the second piston 72b is positioned near the left end of the cylinder 71b and outputs a signal to the 4-port switching valve 61 to cause the switching valve 61 to feed concentrate to the first positive-displacement pump 71 and to discharge the concentrate from the second positive-displacement pump 72. The transmission path of concentrate pressure in this operation is: module 6→line L61→switching valve 61→first pump 71→line L53→check valve CV2→line L52→line L5→module 6 (FIG. 2).

Next, the succeeding power recovery unit 8 will be described with reference to FIG. 4.

The succeeding power recovery unit 8 is connected to the preceding power recovery unit 7 by the communicating line L7. That is, the outlet of the switching valve 61 of the preceding power recovery unit 7 communicates to the inlet of the switching valve 62 of the succeeding power recovery unit 8 via the communicating line L7 so that a remaining pressure P9 of concentrate having passed through the preceding power recovery unit 7 is transmitted to raw water of the succeeding power recovery unit 8.

The succeeding power recovery unit 8 includes a pressure transmission circuit 89 having the 4-port switching valve 62, a pair of the positive-displacement pumps 81, 82, two sets of rod position detectors (87a, 88a), (87b, 88b), and four check valves CV5, CV6, CV7, CV8. These elements function as a pressure conversion unit that converts the remaining pressure P9 of the concentrate into an additional pressure P15 added to the raw water fed to the pretreatment membrane module 3. Of these elements, the 4-port switching valve 62 is controlled by the above controller 20 in operation.

In the succeeding power recovery unit 8, the 4-port switching valve 62 has substantially the same configuration as that of the 4-port switching valve 61 in the previous stage described above, but the positive-displacement pumps 81, 82 have a different type from that of the positive-displacement pumps 71, 72 in the previous stage described above. That is, the positive-displacement pump 81 (82) has a connecting rod 83a (83b) having pistons 82a, 84a (82b, 84b) of different diameters mounted on both ends. The first positive-displacement pump 81 includes a set of the large-diameter cylinder 81a/piston 82a, a set of the small-diameter cylinder 85a/piston 84a, and the connecting rod 83a connecting the large-diameter piston 82a and the small-diameter piston 84a.

The both cylinders 81a, 85a are composed of a container in a cylindrical or rectangular pipe shape to form an enclosed space and one end thereof is open and the other end is closed. The openings of the both cylinders 81a, 85a are opposite to each other. The cylinders 81a, 85a have the inlet/outlet of a pressurized fluid (concentrate or raw water) and an insertion port of the connecting rod 83a formed therein.

The large-diameter piston 82a is attached to one end of the connecting rod 83a and the small-diameter piston 84a is attached to the other end of the rod 83a. That is, the two pistons 82a, 84a share one rod 83a. A dog 86a is formed in the center in the longitudinal direction of the connecting rod 83a. The large-diameter piston 82a is arranged slidably inside the large-diameter cylinder 81a by being supported by the rod 83a and the small-diameter piston 84a is arranged slidably inside the small-diameter cylinder 85a by being supported by the rod 83a.

The high-pressure side chamber is formed from the large-diameter piston 82a and the large-diameter cylinder 81a. A seal material (not shown) is inserted between the large-diameter piston 82a and the large-diameter cylinder 81a. One opening of the large-diameter cylinder 81a communicates to the communicating line L7 so that concentrate is introduced into the high-pressure side chamber from the preceding power recovery unit 7 in the previous stage. The area of the plane of the large-diameter piston 82a receiving pressure from the concentrate introduced into the high-pressure side chamber is A3.

On the other hand, the low-pressure side chamber is formed from the small-diameter piston 84a and the small-diameter cylinder 85a. A seal material (not shown) is inserted between the small-diameter piston 84a and the small-diameter cylinder 85a. One opening of the small-diameter cylinder 85a communicates to the line L21 so that raw water is introduced into the low-pressure side chamber from the raw water tank 2. The area of the plane of the small-diameter piston 84a receiving pressure from the raw water introduced into the low-pressure side chamber is A4.

The area A3 is larger than the area A4 (A3>A4). The ratio of the area A3 to the area A4 is preset based on the remaining pressure P9 of concentrate from the preceding power recovery unit 7, feed pressure P16 of raw water from the raw water tank 2, raw water feed pressure P17 from the pump P1, frictional force between the large-diameter cylinder 81*a* and the large-diameter piston 82*a*, and frictional force between the small-diameter cylinder 85*a* and the small-diameter piston 84*a*.

The second positive-displacement pump 82 includes a set of the large-diameter cylinder 81*b*/piston 82*b*, a set of the small-diameter cylinder 85*b*/piston 84*b*, and the connecting rod 83*b* connecting the large-diameter piston 82*b* and the small-diameter piston 84*b*.

The both cylinders 81*b*, 85*b* are composed of a container in a cylindrical or rectangular pipe shape to form an enclosed space and one end thereof is open and the other end is closed. The openings of the both cylinders 81*b*, 85*b* are opposite to each other. The cylinders 81*b*, 85*b* have the inlet/outlet of a pressurized fluid (concentrate or raw water) and an insertion port of the connecting rod 83*b* formed therein.

The large-diameter piston 82*b* is attached to one end of the connecting rod 83*b* and the small-diameter piston 84*b* is attached to the other end of the rod 83*b*. That is, the two pistons 82*b*, 84*b* share one rod 83*b*. A dog 86*b* is formed in the center in the longitudinal direction of the connecting rod 83*b*. The large-diameter piston 82*b* is arranged slidably inside the large-diameter cylinder 81*b* by being supported by the rod 83*b* and the small-diameter piston 84*b* is arranged slidably inside the small-diameter cylinder 85*b* by being supported by the rod 83*b*.

The high-pressure side chamber is formed from the large-diameter piston 82*b* and the large-diameter cylinder 81*b*. A seal material (not shown) is inserted between the large-diameter piston 82*b* and the large-diameter cylinder 81*b*. One opening of the large-diameter cylinder 81*b* communicates to the line L8 so that a pressurized fluid (concentrate) is discharged from a third space. The area of the plane of the large-diameter piston 82*b* receiving pressure from the pressurized fluid (concentrate) introduced into the third space is A3.

On the other hand, the low-pressure side chamber is formed from the small-diameter piston 84*b* and the small-diameter cylinder 85*b*. A seal material (not shown) is inserted between the small-diameter piston 84*b* and the small-diameter cylinder 85*b*. One opening of the small-diameter cylinder 85*b* communicates to the line L22 so that raw water is introduced into the low-pressure side chamber from the raw water tank 2. The area of the plane of the small-diameter piston 84*b* receiving pressure from the raw water introduced into the low-pressure side chamber is A4. The area A3 is larger than the area A4 (A3>A4). The ratio of the area A3 to the area A4 is preset based on the pressure P9 of concentrate from the power recovery unit 7 in the previous stage, pressure P17 of raw water from the conveying pump P1, frictional force between the large-diameter cylinder 81*b* and the large-diameter piston 82*b*, and frictional force between the small-diameter cylinder 85*b* and the small-diameter piston 84*b*.

The first set of the detectors 87*a*, 88*a* detects the position of the dog 86*a* in the first connecting rod 83*a*. One detector 87*a* is mounted in a position allowing the detector 87*a* to detect contact of the dog 86*a* when the piston 84*a* comes close to the left end of the cylinder 85*a*. On the other hand, the other detector 88*a* is mounted in a position allowing the detector 88*a* to detect contact of the dog 86*a* when the piston 82*a* comes close to the right end of the cylinder 81*a*. When the detectors 87*a*, 88*a* detect the dog 86*a*, detection signals are sent to the controller 20 and accordingly, the positions of the both pistons 82*a*, 84*a* in the first positive-displacement pump 81 are grasped.

The second set of the detectors 87*b*, 88*b* detects the position of the dog 86*b* mounted on the second connecting rod 83*b*. The second set of the detectors 87*b*, 88*b* has the same configuration as that of the first set of the detectors 87*a*, 88*a* and detects the position of the dog 86*b* in the rod 83*b*. When the detectors 87*b*, 88*b* detect the dog 86*b*, detection signals are sent to the controller 20 and accordingly, the positions of the both pistons 82*b*, 84*b* in the second positive-displacement pump 82 are grasped.

The controller 20 outputs a switching signal to the switching valve 62 in accordance with a detection signal from the detectors 87*a*, 88*a*, 87*b*, 88*b*. That is, if detection signals are received from the detectors 87*a*, 88*b*, the controller 20 determines that the piston 84*a* is positioned near the left end of the cylinder 85*a* and the piston 82*b* is positioned near the right end of the cylinder 81*b*. Then, the controller 20 sends a switching signal to the switching valve 62 so that concentrate is discharged from the first positive-displacement pump 81 and also the concentrate is fed to the second positive-displacement pump 82. If detection signals are received from the detectors 88*a*, 87*b*, the controller 20 determines that the piston 82*a* is positioned near the right end of the cylinder 81*a* and the piston 84*b* is positioned near the left end of the cylinder 85*b*. Then, the controller 20 sends a switching signal to the switching valve 62 so that concentrate is fed to the first positive-displacement pump 81 and also the concentrate is discharged from the second positive-displacement pump 82.

In the above embodiment, a case when a 2-cylinder power recovery unit is used is described, but the power recovery unit is not limited to such a structure and a 3-cylinder system can also be adopted. In the power recovery unit in the embodiment, a case when a piston rod is used as a pressure transmission mechanism is described, but a crank shaft as a different pressure transmission mechanism can also be used.

An overview of the operation of the power recovery unit 8 in the subsequent stage will be described.

The controller 20 calculates the positions of the first and second pistons 82*a*, 85*a* inside the first and second cylinders 81*a*, 85*a* based on signals sent from the first detectors 87*a*, 88*a*, and also calculates the positions of the third and fourth pistons 82*b*, 84*b* inside the third and fourth cylinders 81*b*, 85*b* based on signals sent from the second detectors 87*b*, 88*b*. Based on the calculated positions of the pistons 82*a*, 84*a*, 82*b*, 84*b*, the controller 20 determines whether to cause the 4-port switching valve 62 to perform a switching operation and if the controller 20 determines to cause the 4-port switching valve 62 to perform a switching operation, the controller 20 sends an instruction signal thereof to the 4-port switching valve 62.

If detection signals are received from the detectors 87*a*, 88*b*, the controller 20 determines that the first piston 82*a* is positioned near the right end of the cylinder 81*a* and the fourth piston 84*b* is positioned near the left end of the cylinder 85*b* and outputs a signal to the 4-port switching valve 62 to cause the 4-port switching valve 62 to feed concentrate to the first positive-displacement pump 81 and to discharge the concentrate from the second positive-displacement pump 82. The transmission path of concentrate pressure in this operation is: the power recovery unit 7→line L7→switching valve 62→first pump 81→line L23→check valve CV6→line L22→line L2→module 3 (FIG. 4).

On the other hand, if detection signals are received from the detectors 88*a*, 87*b*, the controller 20 determines that the second piston 84*a* is positioned near the left end of the second cylinder 85*a* and the third piston 82*b* is positioned near the right end of the third cylinder 81*b* and outputs a signal to the 4-port switching valve 62 to cause the 4-port switching valve 62 to discharge concentrate from the first positive-displacement pump 81 and to feed the concentrate to the second positive-displacement pump 82. The transmission path of concentrate pressure in this operation is: preceding power recovery unit 7→line L7→switching valve 62→second pump 82→line L23→check valve CV7→line L22→line L2→module 3.

Next, an overview of the operation of a membrane filtration system according to an embodiment will be described.

Raw water is fed to the pretreatment membrane module 3 by the pump P1 at predetermined pressure P17 and passed through an MF membrane or UF membrane to become pretreated water from which a portion of solutes is removed before being stored in the first treated water tank 4. The pretreated water in the first treated water tank 4 is conveyed to the high-pressure pump P4 and the preceding power recovery unit 7 in the previous stage by the conveying pump P3 and the high-pressure pump P4 increases the pressure of the water to the predetermined high pressure P4 (about 6 MPa) before conveying the water to the high-pressure RO membrane module 6. The high-pressure RO membrane module 6 removes solutes such as ions and salts contained in the raw water to generate primary treated water whose solute concentration is lowered. The generated primary treated water is stored in the second treated water tank 9. To get better water in quality, the water in the second treated water tank 9 is conveyed to the low-pressure RO membrane module 10 by the low-pressure pump P6. In the low-pressure RO membrane module 10, solutes such as ions and salts remaining in the water are further removed to generate secondary treated water (product water) whose solute concentration is further lowered. The generated product water is stored in the third treated water tank 11.

On the other hand, brine (concentrated sea water) discharged from the high-pressure RO membrane module 6 is sent to the preceding power recovery unit 7. The preceding power recovery unit 7 has the first positive-displacement pump 71 to which the brine is fed and the second positive-displacement pump 72 from which the brine is discharged. The preceding power recovery unit 7 recovers the pressure of brine and transmits the recovered pressure to the pretreated water on the route of the line L53→the pressure transmission circuit 79→the line L52→the high-pressure line L5. The pretreated water to which the recovered pressure is added is further pressurized by the booster pump P5 to push the high-pressure pretreated water of the high-pressure line L5.

On the other hand, the pretreated water from the protector filter 5 passes through the main line L5 before being fed to the high-pressure pump P4 at, for example, 0.2 MPa and also passes through the check valve CV4 from the branch line L5 before being fed to the second space of a cylinder of the second positive-displacement pump 72 (FIG. 2).

The pretreated water whose pressure is increased to, for example, 6.0 MPa by the high-pressure pump P4 is merged with the pretreated water from the preceding power recovery unit 7 before being introduced into the RO membrane module 6. In this case, the pretreated water from the preceding power recovery unit 7 is water discharged from the second space of the cylinder 71*a* of the first positive-displacement pump 71 and having passed through the check valve CV2. The RO membrane module 6 discharges the treated water and brine.

The brine discharged from the RO membrane module 6 passes through the pressure regulating valve PV1 and the switching valve 61 before flowing into the first space of the cylinder 71*a* of the first positive-displacement pump. At this point, the second space of the cylinder 71*a* of the first positive-displacement pump is filled with pretreated water. The brine pushes the piston 72*a* inside the cylinder 71*a* in the direction of the second space to discharge the pretreated water from the second space while pressurizing the pretreated water.

The area where the piston 72*a* faces the first space is A1 and the area where the piston 72*a* faces the second space is A2 and thus, the pressure P8 of the pretreated water discharged from the second space of the cylinder 71*a* is calculated as $P8=P7\times(A1/A2)$ by using the brine pressure P7 from the switching valve 61. Accordingly, the pressure P8 is a pressure equivalent to the pressure P4 introduced into the high-pressure RO membrane module 6 or a little higher.

The pretreated water from the protector filter 5 passes through the check valve CV4 before flowing into the second space of the cylinder 71*b* of the second positive-displacement pump 72. At this point, the first space of the cylinder 71*b* of the second positive-displacement pump 72 is filled with brine.

The pretreated water having passed through the fourth check valve CV4 has the pressure of, for example, 0.2 MPa and pushes the piston 72*b* inside the cylinder 71*b* in the direction of the first space. The movement of the piston 72*b* in the direction of the first space discharges the brine from the first space of the cylinder 71*b* via the 4-port switching valve 61.

Accordingly, if the above operation is maintained, the one piston 72*a* moves closer to the left end of the cylinder 71*a* and the other piston 72*b* moves closer to the right end of the cylinder 71*b*. Then, the rod 73*a* comes into contact with the first detector 77*a* and a detection signal (contact signal) thereof is sent to the controller 20. Also, the rod 73*a* moves away from the fourth detector 78*b* and a detection signal (non-contact signal) thereof is sent to the controller 20. If detection signals from the first and fourth detectors 77*a*, 78*b* are received, the controller 20 sends a control signal to the 4-port switching valve 61 to switch the direction of inflow and discharge of brine. Accordingly, the inflow and discharge of brine are switched and the pistons 72*a*, 72*b* move in arrow directions. That is, as shown in FIG. 3, the brine is introduced into the second positive-displacement pump 72 and the brine is discharged from the first positive-displacement pump 71.

The brine discharged from the high-pressure RO membrane module 6 passes through the pressure regulating valve PV1 and the 4-port switching valve 61 before flowing into the first space of the cylinder 71*b* of the second positive-displacement pump 72. At this point, the second space of the cylinder 71*b* of the second positive-displacement pump 72 is filled with pretreated water. The brine pushes the piston 72*b* inside the cylinder 71*b* in the direction of the second space to discharge the brine from the second space while pressurizing the pretreated water.

The area where the second piston 72*b* faces the first space is A1 and the area where the second piston 72*b* faces the second space is A2 and thus, the pressure P10 of the pretreated water discharged from the second space of the cylinder 71*b* is calculated as $P10=P7\times(A1/A2)$ by using the brine pressure P7 from the switching valve 61. Accordingly, the pressure P10 is a pressure equivalent to the pressure P4 introduced into the RO membrane module 6 or a little higher.

The brine from which the pressure is recovered from the preceding power recovery unit 7 is further sent to the succeeding power recovery unit 8. The remaining pressure P9 of the brine is recovered by the succeeding power recovery unit 8 and the recovered pressure is transmitted to the raw water in the downstream line L2 of the pump P1. The raw water to which the additional pressure is added is sent to the pretreatment membrane module 3. For the rise in pressure, the pressure regulating valve V1 is controlled in accordance with a difference (inter-membrane differential pressure) ΔP between the measured pressure P17 at upstream of the membrane module 3 measured by the first manometer G1 and the measured pressure P18 at downstream of the membrane module 3 measured by the second manometer G2 to obtain the pressure necessary to feed raw water to the pretreatment membrane module 3. One end of the pressure regulating valve V1 is open to the air and thus, the gauge pressure of the first space of the cylinder 71b of the second positive-displacement pump 72 is approximately zero. The pretreated water having passed through the fourth check valve CV4 has the pressure of, for example, 0.2 MPa and moves the piston 72b inside the cylinder 71b in the direction of the first space. The pretreated water pushes the piston 72b in the direction of the first space to discharge the brine from the first space.

The washing pump P2 is driven periodically at predetermined intervals to cause the pretreated water in the first treated water tank 4 to flow backward to the pretreatment membrane module 3 via the back washing line L12 for back washing of the MF membrane or UF membrane in the module. In this case, bubbling to feed a compressed air into the membrane module 3 from the compressor C1 may be used in combination.

Next, an overview of the operation of the pressure regulating valve V1 will be described with reference to FIG. 5.

The pump P1 is activated to start feeding of raw water from the raw water tank 2 to the pretreatment membrane module 3. The pump P3 is activated to start feeding of pretreated water from the first treated water tank 4 to the protector filter 5 and further, after water having passed through the protector filter 5 being fed to the power recovery line L52 by activating the booster pump P5, the high-pressure pump P4 is activated to apply a high pressure to the water having passed through the protector filter 5 to feed the water to the high-pressure RO membrane module 6 and also a supplementary pressure is applied to a fluid passing through the pressure transmission like L52 by the booster pump P5 to start treatment (step K1). When the treatment is started, the pressure regulating valve V1 is open.

After the pressure regulating valve V1 is closed (step K2), the pressure P17 upstream of the pretreatment membrane module 3 is measured by the first manometer G1 (step K3). After the pressure regulating valve V1 is closed (step K2), the pressure P18 downstream of the pretreatment membrane module 3 is measured by the second manometer G2 (step K4). The controller 20 calculates the differential pressure ΔP between the both measured pressures P17, P18 (step K5) and compares the calculated differential pressure LIP with a preset permissible pressure Pc to determine whether the differential pressure ΔP is equal to or less than the permissible pressure Pc (step K6). If the determined membrane differential pressure ΔP is smaller than or equal to the predetermined set pressure value Pc, the pressure regulating valve V1 is opened to adjust the brine pressure P6 discharged from the high-pressure RO membrane module 6 to a desired value. If the determined membrane differential pressure ΔP is larger than the predetermined set pressure value Pc, the pressure P17 in the upstream side and the pressure P18 on the downstream side are measured again while the pressure regulating valve V1 is closed to continue the calculation of the membrane differential pressure ΔP. That is, if the determination result of process K6 is NO, the operation of the steps K2 to K6 is repeated by returning to before the step K2. If the determination result of step K6 is YES (ΔP≤Pc), the pressure regulating valve V1 is opened (step K7) and the operation of the steps K3 to K6 is repeated by returning to after the step K2.

The back washing operation of the pretreatment membrane module 3 will be described.

The washing pump P2 is driven periodically at predetermined intervals to cause the pretreated water in the first treated water tank 4 to flow backward to the pretreatment membrane module 3 via the back washing line L12 for back washing of the MF membrane or UF membrane in the pretreatment membrane module 3. In this case, bubbling to feed a compressed air into the membrane module 3 from the compressor C1 is used in combination. Accordingly, foreign matter such as solid content adhering to the MF membrane or UF membrane is removed so that membrane clogging is eliminated.

According to the membrane filtration system in the embodiment, pump power supplied to the RO membrane module can be reduced and also pump power supplied to the pretreatment membrane module can be reduced so that total running costs can be reduced.

Second Embodiment

Next, a membrane filtration system according to the second embodiment will be described with reference to FIG. 4. The description of a portion of the present embodiment that is common to the above embodiment is omitted.

A membrane filtration system 1A in the second embodiment has a configuration in which the washing pump P2 is omitted from the system 1 in the first embodiment. Instead, the back washing line L42 is provided between immediately the downstream side of the conveying pump P3 and the downstream side of the pretreatment membrane module 3.

In the embodiment, the pretreated water is sent from the first treated water tank 4 to the pretreatment membrane module 3 through the back washing line L42 by a driving force of the conveying pump P3 to backwash the MF membrane or UF membrane in the membrane module 3.

According to the above-mentioned embodiment, total equipment costs and running costs can be reduced by omitting a washing pump dedicated to back washing.

Third Embodiment

Next, a membrane filtration system according to the third embodiment will be described with reference to FIG. 5. The description of a portion of the present embodiment that is common to the above embodiments is omitted.

A membrane filtration system 1B in the third embodiment has a configuration in which the first treated water tank 4, the washing pump P2, the conveying pump P3, and the protector filter 5 are omitted from the system 1 in the first embodiment. Instead, the back washing line L92 is provided between immediately the downstream side of the low-pressure pump P6 and the downstream side of the pretreatment membrane module 3.

In the embodiment, the primary treated water is sent from the treated water tank 9 to the pretreatment membrane module 3 through the back washing line L92 by a driving force of the low-pressure pump P6 to reversely clean the MF membrane or UF membrane in the membrane module 3.

According to the above-mentioned embodiment, total equipment costs and running costs can be reduced by omitting the first treated water tank 4, the washing pump P2, the conveying pump P3, and the protector filter 5.

Fourth Embodiment

Next, a membrane filtration system according to the fourth embodiment will be described with reference to FIG. 6. The description of a portion of the present embodiment that is common to the above embodiments is omitted.

A membrane filtration system 1C in the fourth embodiment has a configuration in which the first treated water tank 4, the washing pump P2, the conveying pump P3, and the protector filter 5 are omitted from the system 1 in the first embodiment. Instead, the back washing line L112 is provided between immediately the downstream side of the conveying pump P7 and the downstream side of the pretreatment membrane module 3.

In the embodiment, the product water is sent from the treated water tank 11 to the pretreatment membrane module 3 through the back washing line L112 by a driving force of the conveying pump P7 to reversely clean the MF membrane or UF membrane in the membrane module 3.

According to the above-mentioned embodiment, total equipment costs and running costs can be reduced by omitting the first treated water tank 4, the washing pump P2, the conveying pump P3, and the protector filter 5.

Fifth Embodiment

Next, a membrane filtration system according to the fifth embodiment will be described with reference to FIG. 7. The description of a portion of the present embodiment that is common to the above embodiments is omitted.

A membrane filtration system 1D in the fifth embodiment has a configuration in which the brine tank 23, the washing pump P8, and the back washing line L82 are added to the system 1 in the first embodiment.

In the embodiment, the product water is sent from the brine tank 23 to the pretreatment membrane module 3 through the back washing line L82 by a driving force of the washing pump P8 to backwash the MF membrane or UF membrane in the membrane module 3.

According to the above-mentioned embodiment, total running costs can be reduced by washing the membrane filter with brine to improve the recovery of a system.

Sixth Embodiment

Next, a membrane filtration system according to the sixth embodiment will be described with reference to FIG. 8. The description of a portion of the present embodiment that is common to the above embodiments is omitted.

A membrane filtration system 1E in the sixth embodiment has a configuration in which the hot water tank 27 with a heater 28 and the washing lines L112, L121, L122, L123 are added to the system 1 in the first embodiment. As a unit to produce hot water, instead of the heater 28, an energy-saving heat pump or natural energy may be used.

In the embodiment, the product water is sent from the third treated water tank 11 to the hot water tank 27 by a driving force of the conveying pump P7 and further, the hot water is sent to the pretreatment membrane module 3 through the washing lines L112, L123 for, in addition to normal washing, backwashing of the MF membrane module or UF membrane module with water whose temperature is higher than that of normal washing water at periodic frequency. Also, the product water is sent from the third treated water tank 11 to the hot water tank 27 by a driving force of the conveying pump P7 and the hot water is sent to the reverse osmosis membrane module 6 in the first stage through the washing lines L112, L122 to wash the RO membrane and also, the hot water is sent to the reverse osmosis membrane module 10 in the second stage through the washing lines L112, L121 to wash the RO membrane.

According to the above-mentioned embodiment, total running costs can be reduced by washing the MF membrane or UF membrane and the RO membrane with hot water to improve the recovery of a system.

According to the embodiments, total running costs can be reduced by reducing power of a raw water feed pump and a high-pressure pump.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A membrane filtration system, comprising:
   a raw water tank configured to accommodate a raw water containing solutes and insoluble components;
   a pretreatment membrane module that separates and removes the insoluble components from the raw water fed from the raw water tank;
   a raw water feed line having a raw water feed pump to feed the raw water from the raw water tank to the pretreatment membrane module;
   a high-pressure reverse osmosis membrane module provided in downstream of the pretreatment membrane module to separate and remove the solutes from pretreated water providing treated water as permeate and concentrate as retentate;
   a low-pressure reverse osmosis membrane module provided in downstream of the high-pressure reverse osmosis membrane module and to which a pressure lower than that applied to the high-pressure reverse osmosis membrane module is applied to separate and remove remaining solutes from the treated water;
   a high-pressure line having a high-pressure pump to feed the pretreated water to the high-pressure reverse osmosis membrane module at a predetermined high pressure;
   a preceding power recovery unit having a positive-displacement pump to which a portion of each of brine and the pretreated water are fed and which pressurize the pretreated water by transmitting pressure of the concentrate to the pretreated water;
   a succeeding power recovery unit having a positive-displacement pump to which a portion of each of the concentrate from the preceding power recovery unit and the raw water are fed and which pressurize the raw water by transmitting a remaining pressure of the concentrate to the raw water;

a concentrate discharge line through which the concentrate discharged from the high-pressure reverse osmosis membrane module flows to transmit pressure of the discharged concentrate to the positive-displacement pump of the preceding power recovery unit;

a communicating line communicating the preceding power recovery unit and the succeeding power recovery unit and through which the concentrate from the preceding power recovery unit flows;

a first pressure transmission line branched from the high-pressure line and communicating to the preceding power recovery unit and through which a portion of the pretreated water to be fed to the high-pressure reverse osmosis membrane module flows;

a second pressure transmission line branched from the raw water feed line and communicating to the succeeding power recovery unit and through which a portion of the raw water to be fed to the pretreatment membrane module flows;

a drain line to discharge the concentrate from the succeeding power recovery unit;

a pressure regulating valve provided in the drain line to regulate a discharge of the concentrate from the succeeding power recovery unit in accordance with a pressure loss in the pretreatment membrane module;

a treated water tank arranged in a subsequent stage of the pretreatment membrane module to accommodate the pretreated water having passed through the pretreatment membrane module;

a water conveyance line having a conveying pump to feed the pretreated water from the treated water tank to the high-pressure pump; and a back washing line branched from the water conveyance line between a downstream side of the conveying pump and the high-pressure pump, and communicating to the pretreatment membrane module, to guide the pretreated water that feeds to the high-pressure pump to the pretreatment membrane module by driving of the conveying pump, wherein the pretreatment membrane module generates the pretreated water, which is processed by the high-pressure reverse osmosis membrane module to provide the treated water.

2. The system according to claim 1, further comprising:

a first manometer that measures a pressure upstream of the pretreatment membrane module;

a second manometer that measures a pressure downstream of the pretreatment membrane module; and a controller that determines a membrane differential pressure $\Delta P$ of the pretreatment membrane module from measured pressures of the first and second manometers, regulates the pressure of the concentrate discharged from the high-pressure reverse osmosis membrane module by opening the pressure regulating valve if the determined membrane differential pressure $\Delta P$ is smaller than or equal to a set pressure value Pc, and maintains the pressure regulating valve closed if the determined membrane differential pressure $\Delta P$ is larger than the set pressure value Pc.

\* \* \* \* \*